(12) United States Patent
Harkins et al.

(10) Patent No.: US 6,493,651 B2
(45) Date of Patent: Dec. 10, 2002

(54) METHOD AND SYSTEM FOR DETERMINING MAGNETIC ATTITUDE

(75) Inventors: Thomas E. Harkins, Joppa, MD (US); David J. Hepner, Elkton, MD (US); Bradford Davis, Jarrettsville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 130 days.

(21) Appl. No.: 09/740,762

(22) Filed: Dec. 18, 2000

(65) Prior Publication Data

US 2002/0111762 A1 Aug. 15, 2002

(51) Int. Cl.$^7$ ................................................ G01C 17/00
(52) U.S. Cl. ................ 702/151; 324/207.15; 344/3.15; 356/141.2
(58) Field of Search ........................ 702/151; 701/13; 356/141.2, 141.5; 324/247, 346, 207.15; 244/3.15, 3.16, 166; 342/63

(56) References Cited

U.S. PATENT DOCUMENTS

| | | | | |
|---|---|---|---|---|
| 4,767,988 A | * | 8/1988 | Wilson | 324/207.15 |
| 5,321,631 A | * | 6/1994 | Germanetti | 33/356 |
| 5,909,275 A | * | 6/1999 | Hepner et al. | 356/141.2 |
| 6,347,763 B1 | * | 2/2002 | Harkins et al. | 244/3.15 |
| 6,398,155 B1 | * | 6/2002 | Hepner et al. | 244/3.15 |

* cited by examiner

Primary Examiner—Kamini Shah
(74) Attorney, Agent, or Firm—Paul S. Clohan, Jr.

(57) ABSTRACT

A system which derives the attitude of a body as it rotates and travels through the earth's magnetic field. At least one magnetometer is placed in the body and provides an output signal during flight of the body. The zero crossings of the output signal are used to formulate a time discriminant. This time discriminant is compared with a roll angle discriminant for which a value of attitude has been previously determined. From the comparison, the attitude during flight may be determined. A time discriminant can also be formulated using two magnetometers.

12 Claims, 7 Drawing Sheets

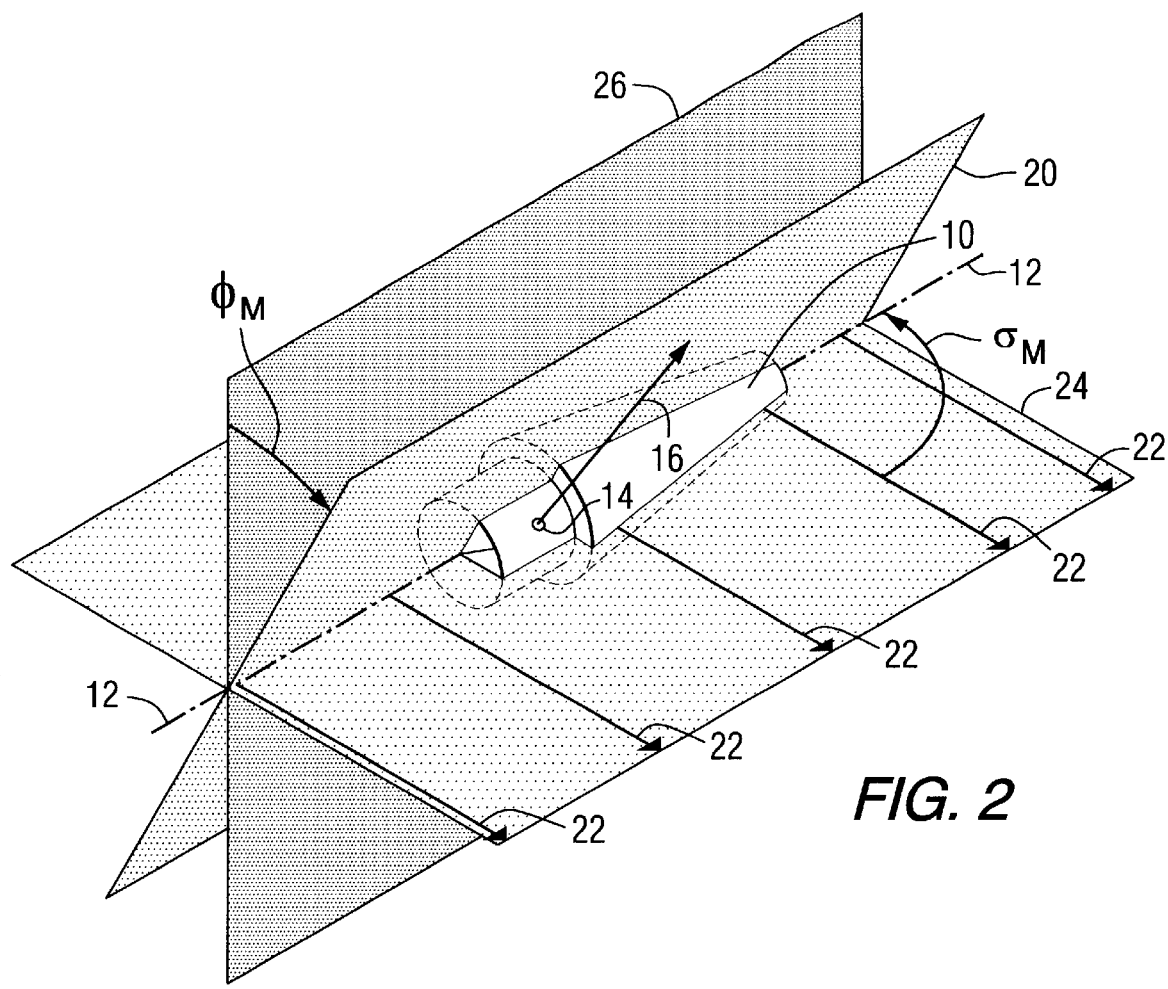
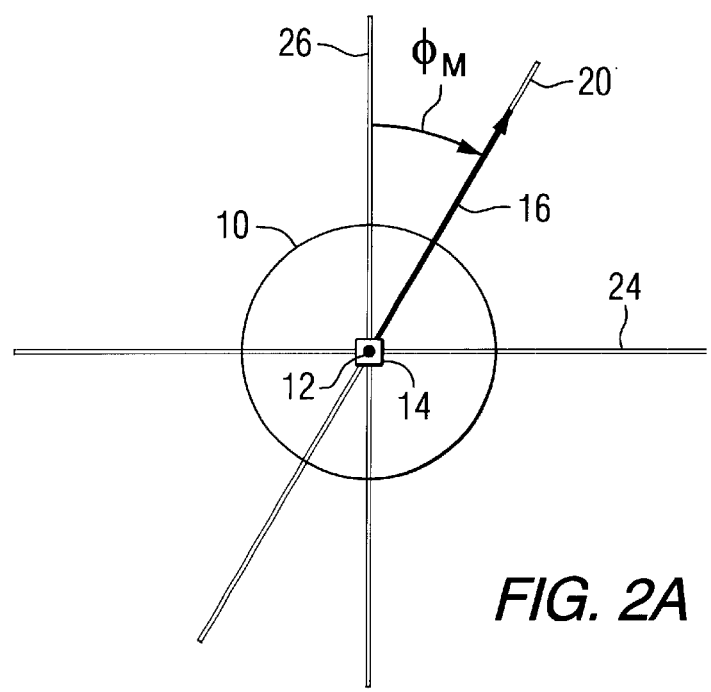
FIG. 2
FIG. 2A

METHOD AND SYSTEM FOR DETERMINING MAGNETIC ATTITUDE

STATEMENT OF GOVERNMENT INTEREST

The invention described herein may be manufactured and used by or for the Government of the United States of America for government purposes without the payment of any royalties therefor.

BACKGROUND OF THE INVENTION

Accurate measurement of the angular motions of spinning bodies with on-board sensors has been recognized as a significant contribution to the research and development of experimental projectiles and rockets and to the diagnosis of existing munitions systems. Sun sensor arrays, such as described in U.S. Pat. No. 5,909,275 have been developed to measure the attitude of a spinning body utilizing the sun as a parallel light source. These devices are restricted to bright sunshine conditions and require an external modification to the body to physically accommodate the sensors.

Devices responsive to the earth's magnetic field have long been used for estimating heading. Traditional compasses indicate only the direction of the horizontal component of the earth's field, whereas it is often desired to have knowledge of the angle of the body with respect to the local magnetic field. The orientation of the field with respect to a three-dimensional, earth-fixed coordinate system changes both with location and with time. It is important to note that determination of orientation with respect to the earth's magnetic field in three-dimensional space does not uniquely specify orientation with respect to the earth (or other possible navigation frames); another datum is required, e.g., a vertical reference.

Existing magnetic sensing devices require some or all of the following for relative heading measurements: moving parts, three dimensions of sensor measurements, knowledge of the magnetic field components, knowledge of the strength of the magnetic field, gain calibration of the sensor(s), and sensor temperature compensation.

Additionally, all other known systems giving orientations with respect to a magnetic field make those determinations from one or more of four basic measurement types: 1) field strength along a sensor axis, 2) relative field strength along multiple sensor axes, 3) rate of change of field strength along a sensor axis, 4) relative rates of change along multiple sensor axes. In every case, the measurements are premised on some evaluation of a component of the magnetic field along a sensor axis.

For example, U.S. Pat. No. 4,767,988 discloses a device with three axes of magnetometers in two distinct planes that must be rotated about at least two of these axes to determine orientation within a magnetic field. This requires that the sensor move with respect to the platform on which it is mounted. This also requires that the gain of each of the three sensor axes be known as the sensor processing methodology depends upon accurate measurement of changes in field strength with changes in sensor orientation. The data processing is computationally demanding, requiring many matrix operations and averaging of many computed quantities.

The system of the present invention makes the same measurement of magnetic heading but has no moving parts, has a single plane of sensor measurements, and has no gain calibration requirement of its sensors. Further, the only computations required are two scalar subtractions, a scalar division, and a look-up (and possible interpolation). The simplicity of this methodology makes feasible real-time, on-board processing.

SUMMARY OF THE INVENTION

It is the primary object of the present invention to provide a system and a simple, robust methodology wherein one or more magnetometers sensitive to the strength of a magnetic field can be used to determine the magnetic attitude and magnetic roll position of a rotating body with respect to that field.

The system can be used for the estimation of the in-flight attitude, that is, the angular orientation, to an accuracy of 0.1 degrees of spinning bodies with respect to the earth's magnetic field. This use relates to a configuration incorporating one or more magnetometers and a method for determining the orientation of the apparatus relative to the earth's magnetic field. This determination is made on the basis of the magnetometer(s) phase information during a roll cycle and is amplitude independent. Manufacturing tolerances on scale factor and/or gain variations, which are the bane of many inertial measurement units (IMUs), have no effect on system performance of the present invention.

The system provides a unique all-weather, day/night magnetic angular measurement capability for spinning bodies that does not currently exist. In addition, this system may supplement or include other measurement techniques in a hybrid configuration as to provide further IMU-type data and could replace some existing optical measurement techniques wherein an exterior surface needs to be compromised. Potential applications for the system include, but are not limited to, orientation and attitude of any rotating body including navigation aids, rockets, projectiles, satellites, and deep-space exploration vehicles. The measurement capability can be integrated into the guidance and control capabilities of airborne spinning bodies without regard to their exterior geometry.

To obtain an indication of the angular orientation of a rotating body, relative to a magnetic field, such as the earth's magnetic field, a sensor array having at least one magnetometer is placed within the body prior to launch. During flight, the magnetometer will provide an output signal which varies between positive and negative values and which has periodic zero crossings during flight and as the body rotates.

A look-up table is generated, preferably prior to flight, of a roll angle discriminant, based upon zero crossings, versus angular orientation. A time discriminant is continuously obtained, based upon the zero crossings during actual flight of the spinning body through the earth's magnetic field. During, or after the flight, the look-up table is accessed to ascertain the closest match between a time discriminant and a roll angle discriminant to obtain a flight history of the values for the angular orientation of the body with respect to the magnetic field.

BRIEF DESCRIPTION OF THE DRAWINGS

The invention will be better understood, and further objects, features and advantages thereof will become more apparent from the following description of the preferred embodiment, taken in conjunction with the accompanying drawings, in which:

FIG. 2 illustrates the body of FIG. 1 in relation to various planes.

FIG. 2A is an end view of the body in FIG. 2.

DETAILED DESCRIPTION OF THE PREFERRED EMBODIMENTS

Figure 1:
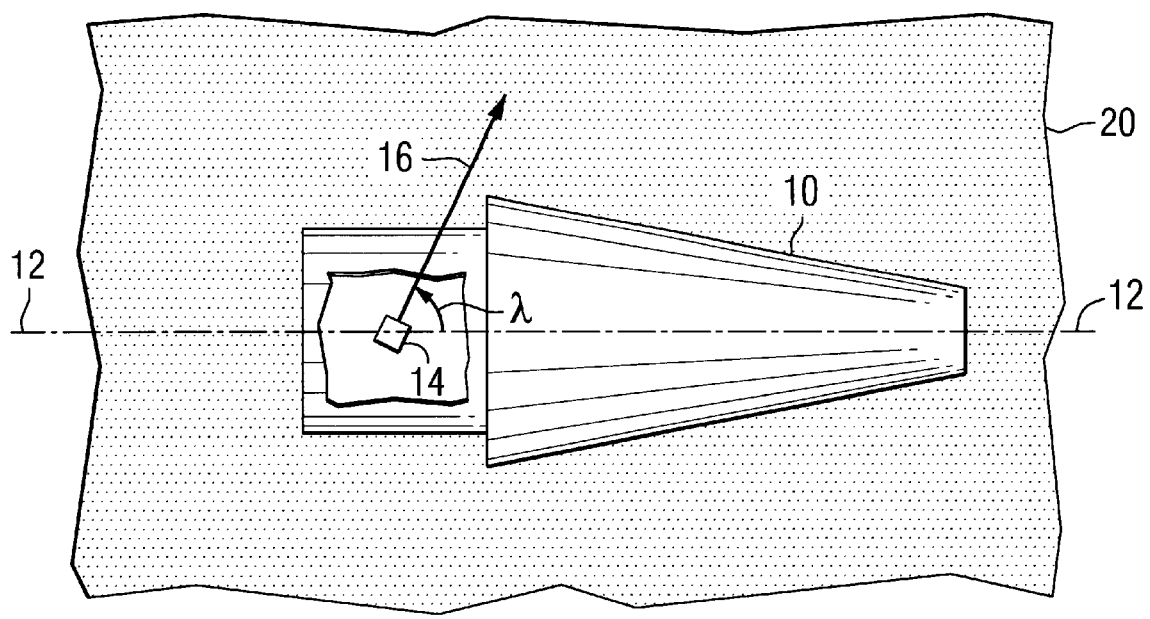
FIG. 1 is a side view of a body which spins about an axis of rotation and carries a magnetometer.

In the drawings, which are not necessarily to scale, like or corresponding parts are denoted by like or corresponding reference numerals.

The earth's magnetic field is a vector quantity that has both magnitude and direction. There are many kinds of magnetic sensors that respond to this field in various ways. Some magnetometers, called scalar sensors, only measure magnitude of a field. Others, called omni-directional sensors, measure the magnitude of the component of a magnetic field that is along a sensitive axis of the magnetometer. In the system of the present invention, determination of body orientation is accomplished by a geometric interpretation of the component of the local magnetic field in a particular direction with respect to that body. Thus, the system requires a magnetometer with a sensitive axis, but, as will be explained, the magnetometer will not need to accurately measure the magnitude of the component along that axis but only determine if there is a component present along that axis. Various commercially available sensors satisfy this requirement.

The choice of magnetometer for a particular application will often depend on the operational environment. For example, in gun-launched and tube-launched ordnance applications, there are size, frequency, and survivability criteria that favor some of the newer magnetic sensing technologies such as giant magnetoresistive sensors (GMR). In another application, a different type of sensor might well be employed. The system's only requirement is for a magnetometer that can detect the presence of a component of a magnetic field along its axis.

Given such a magnetometer, sensor output is a function of the magnetic field strength, orientation of the axis of rotation of the body with respect to the field, the magnetic roll angle of the body, and the geometry of the sensor installation. Making angular measurements using the system of the present invention only requires the magnetic sensor(s) to identify the times at which there is no magnetic field along the sensor axis. That is, the measurements are premised on the absence of a magnetic field component along a sensor axis.

Figure 1A:
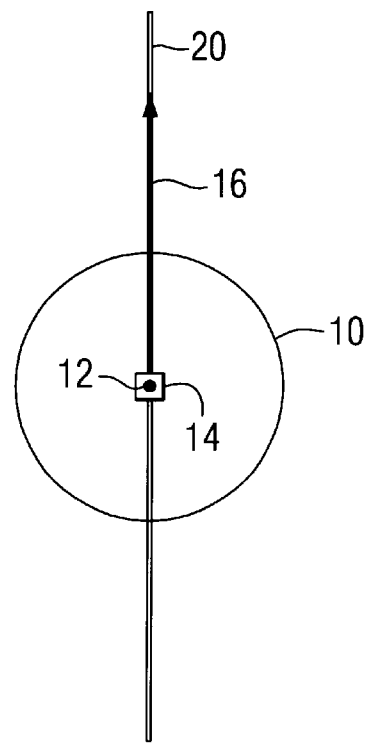
FIG. 1A is an end view of the body in FIG. 1.

FIG. 1 illustrates a spinning body 10, rotating about an axis of rotation 12 as it travels along a path through space. By way of example, the body 10 may be a fuze which is attached to an artillery projectile (not shown). A sensor array comprised of a single magnetometer 14 is installed so that its sensitive axis 16 is at an angle A with respect to the axis of rotation 12 of the body 10. Additionally, the magnetometer 10 is mounted so that its axis 16 is co-planar with the axis of rotation 12, defining a plane designated as the sensor plane 20. An end view representation of the components is illustrated in FIG. 1A.

In FIG. 2 the components of FIG. 1 are illustrated in relation to a magnetic field, such as the earth's magnetic field. More particularly, arrows 22 represent magnetic field vectors lying in a magnetic plane 24 which is coincident with the axis of rotation 12 and which passes through magnetometer 14. The exact inclination of the magnetic plane 24 and orientation of magnetic field vectors relative to body 10 would depend upon its general location on the earth and exact path of travel. The angle between the axis of rotation 12 and the magnetic field vectors 22 is defined as $\sigma_M$ and is the value of angular orientation which is derived by the system of the present invention.

As the body 10 spins through a complete rotation, the magnetic plane 24 remains fixed and the sensor plane 20 rotates with the body 10. Therefore the two planes 20 and 24 would only coincide twice within that period and the magnetometer output would vary sinusoidally experiencing a positive maximum and a negative minimum. Intermediate these two maximum and minimum values, the waveform passes through zero. These zero crossings are used herein to obtain $\sigma_M$. Also shown in FIG. 2 is a reference plane 26 which is used to define the roll angle $\phi_M$ between the reference plane 26 and rotating sensor plane 20. An end view representation of the components is illustrated in FIG. 2A.

With these variable definitions, the output of a magnetic sensor whose response is proportional to the magnetic field strength along its axis is given by:

$$O_S = (G_S)|M|[\cos(\lambda)\cos(\sigma_M) + \sin(\lambda)\sin(\sigma_M)\sin(\phi_m)] \quad (1)$$

where $G_S$ is the gain of the sensor and $|M|$ is the magnitude of the field. With the single exception of the case when the axis of rotation and the field vector are collinear, any magnetometer whose axis is not along the body's axis of rotation will have an output that is roll modulated by the term $[\sin(\lambda)\sin(\sigma_M)\sin(\phi_M)]$. Additionally, for any sensor whose axis is not orthogonal to the axis of rotation of the body, if $\sigma_M \neq 90°$, there is a bias term in it's output, i.e., $[\cos(\lambda)\cos(\sigma_M)]$. The waveform resulting from the interaction of the roll-modulated and bias terms can be seen in FIG. 3 which shows the non-dimensionalized output for a magnetometer sensor with $\lambda=60°$, during two successive rotations and for two values of $\sigma_M$.

Figure 3:
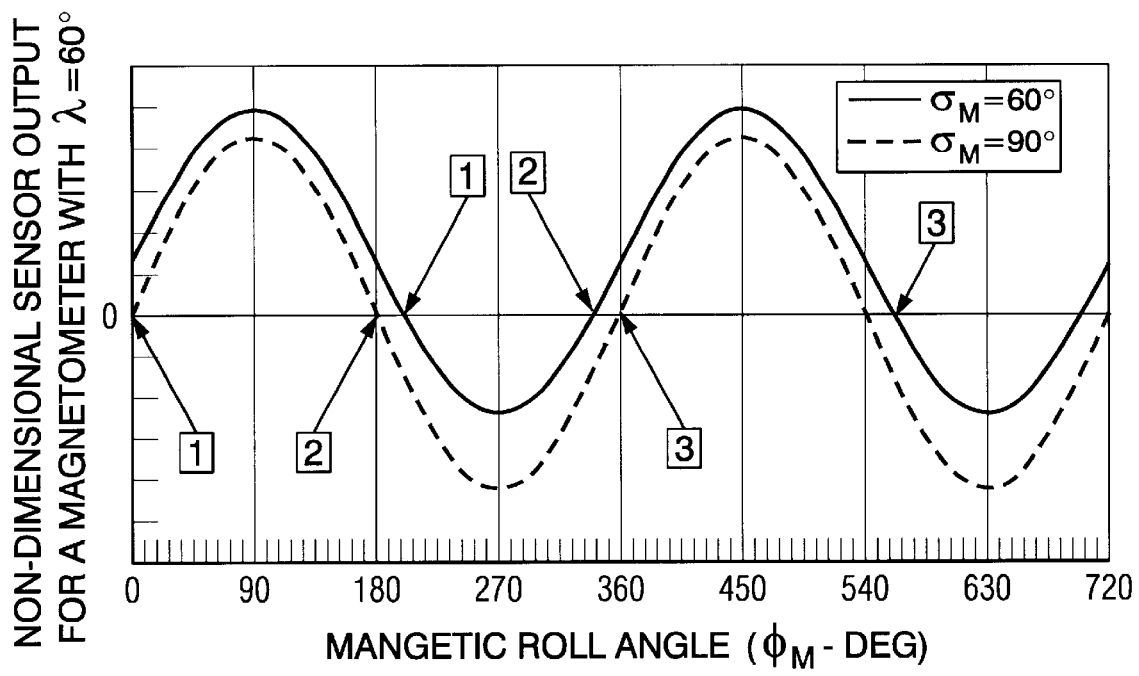
FIG. 3 is a waveform illustrating magnetometer amplitude versus magnetic roll angle.

The dashed curve in FIG. 3 gives the sensor output when $\sigma_M=90°$ (as in FIG. 2) and the solid curve gives the output when $\sigma_M=60°$. On each curve, the first three zero crossings are indicated. These zero outputs occur when the sensor's axis is perpendicular to the field. Denoting the magnetic roll angles at these zero crossings as $\phi_{S1}$, $\phi_{S2}$, and $\phi_{S3}$ for the solid curve and as $\phi_{D1}$, $\phi_{D2}$, and $\phi_{D3}$ for the dashed curve respectively, the ratios $$\Phi_S = \frac{(\phi_{S2} - \phi_{S1})}{(\phi_{S3} - \phi_{S1})} \quad \text{and} \quad \Phi_D = \frac{(\phi_{D2} - \phi_{D1})}{(\phi_{D3} - \phi_{D1})}$$

are formed (for a single curve, the D or S subscript in the discriminant would not be present). Observing that the period between every second zero crossing is a roll cycle, these ratios can be generalized for any set of three successive zero crossings as $$\Phi_S = \frac{(\phi_{Si} - \phi_{S(i-1)})}{(360)} \quad \text{and} \quad \Phi_D = \frac{(\phi_{Di} - \phi_{D(i-1)})}{(360)}.$$

The respective values of $\Phi_S$ and $\Phi_D$ are unique discriminants of the values of $\sigma_M$ corresponding to the two curves. This discriminant similarly applies to any combination of sensor installation angle, $\lambda \neq 0°$ or $90°$, and axis of rotation orientation in the field ($\sigma_M$) for which there are times when the sensor axis is perpendicular to the field during a body rotation. This criterion is defined algebraically as those combinations of $\lambda$ and $\sigma_M$ for which there exist a value of $\phi_M$ solving Equation 1 when the output of the sensor is zero ($O_S=0$). In other words, whenever there is a solution to $$\phi_M = \sin^{-1}\left(\frac{-\cos(\sigma_M)\cos(\lambda)}{\sin(\sigma_M)\sin(\lambda)}\right), \quad (2)$$

ratio $\Phi$ computed as above is a unique discriminant of the angle $\sigma_M$. The existence criterion for $\phi_M$ of $$\left|\frac{-\cos(\sigma_M)\cos(\lambda)}{\sin(\sigma_M)\sin(\lambda)}\right| \leq 1$$

leads to the requirement that $$90 - \lambda \leq \sigma_M \leq 90 + \lambda \quad (3)$$

Thus, given a sensor installed on a rotating body with $0 < \lambda < 90$, the orientation of the axis of rotation of that body within a magnetic field can be determined by computing $\Phi$ for all orientations satisfying Equation 3.

Such a table of $\Phi$ versus $\sigma_M$ can be easily generated analytically for any known value of $\lambda$, but unfortunately the typical tolerances associated both with the manufacture of sensors and with the installation of those sensors in bodies are such that a laboratory calibration of the actual value of $\lambda$ for individual sensor arrangements will at times be required. This calibration may be made using a magnetic field generator. Body roll positions at the orthogonality condition are measured and a table of $\Phi$ versus $\sigma_M$ is generated.

When this body is subsequently installed on a projectile and launched into aeroballistic flight, the independent variable associated with the magnetometer's output will be time not magnetic roll angle. In flight then, what can be determined is not the magnetic roll angles at which three consecutive zero crossings occur, but the times at which these zero crossings occur. Denoting the times at which three consecutive crossings occur as $\phi_{Ta}$, $\phi_{Tb}$, and $\phi_{Tc}$ respectively, an estimate ($\overline{\Phi}$) of the ratio ($\Phi$) is obtained by $$\overline{\Phi} = \frac{(\phi_{Tb} - \phi_{Ta})}{(\phi_{Tc} - \phi_{Ta})}. \quad (4)$$

If the roll rate is constant and $\sigma_M$ is invariant over the three consecutive zero-crossings, this estimated ratio is exactly the same as the calibration ratio. Though constant roll rate and orientation are not typically true of projectiles in flight, it is often the case that the changes in roll rate and/or projectile orientation during a single roll cycle are so small that application of Equation 4 yields a highly accurate estimate of $\Phi$ and thus an accurate measure of $\sigma_M$. For such flight bodies, a single-sensor system will provide the desired measure of body orientation. Further, the crossing times can be used to determine magnetic roll rate and roll acceleration.

Application of the single-sensor system for orientation and roll rate measurements is not restricted to ordnance projectiles. It can be used on any body whose orientation and roll rate do not change significantly over three consecutive zero crossings. In cases where significant changes do occur, accurate estimates of $\Phi$ and $\sigma_M$ can still oftentimes be made with a single-sensor system using advanced reduction techniques.

Figure 4:
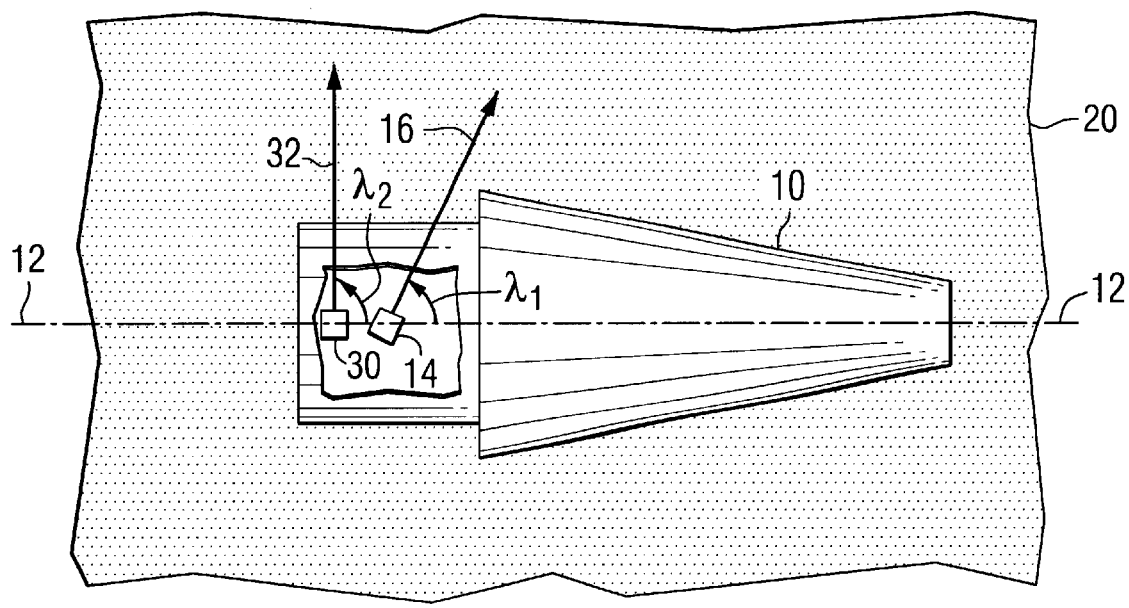
FIG. 4 is a view, as in FIG. 1, illustrating an embodiment which utilizes two magnetometers.
Figure 4A:
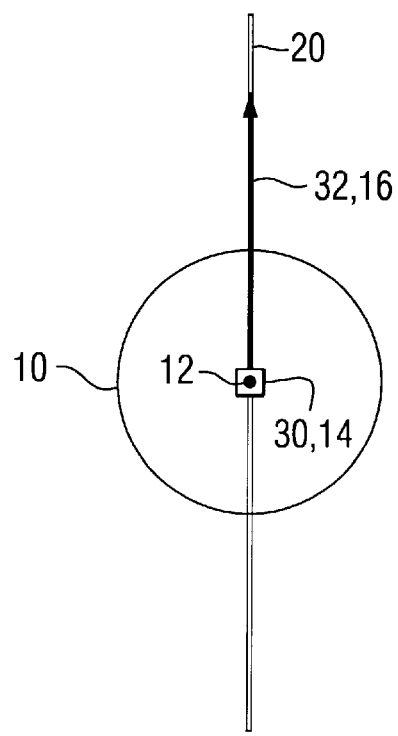
FIG. 4A is an end view of the body in FIG. 4.

However, with the addition of a second sensor, a dual-sensor embodiment of the invention is realized that yields accurate estimates of $\sigma_M$ on aeroballistic projectiles even when they are experiencing significant yawing motions and roll rate changes. FIG. 4 shows the components of FIG. 1, however, with the sensor array being comprised of magnetometer 14 oriented with its axis at an angle $\lambda_1$ and an additional magnetometer 30 having its sensitive axis 32 oriented at an angle $\lambda_2$ with respect to the axis of rotation 12. A limitation on the angles $\lambda_1$ and $\lambda_2$ is that they are non-supplementary, that is, they do not add up to 180°. An end view representation is illustrated in FIG. 4A.

Figure 5:
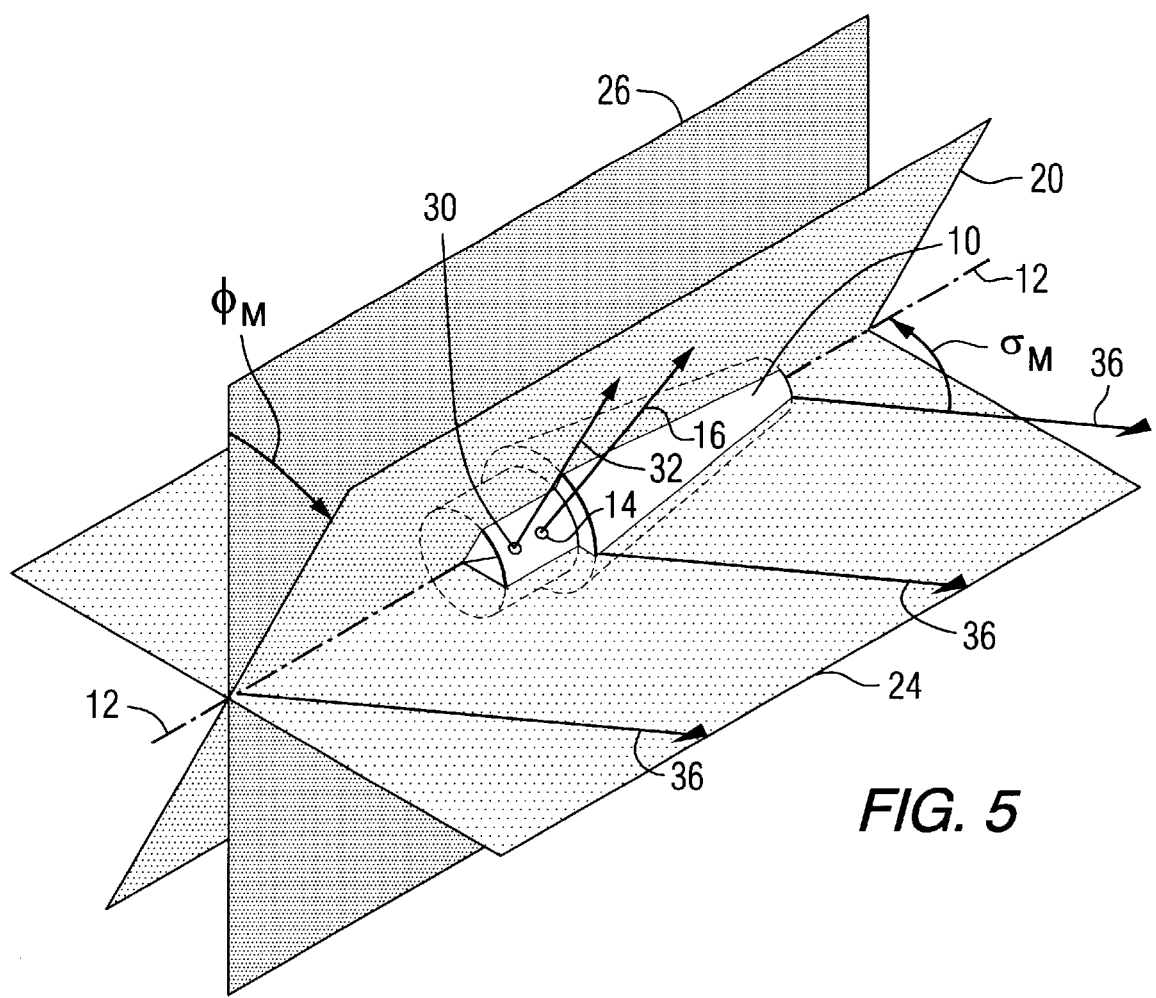
FIG. 5 illustrates the body of FIG. 4 in relation to various planes.
Figure 5A:
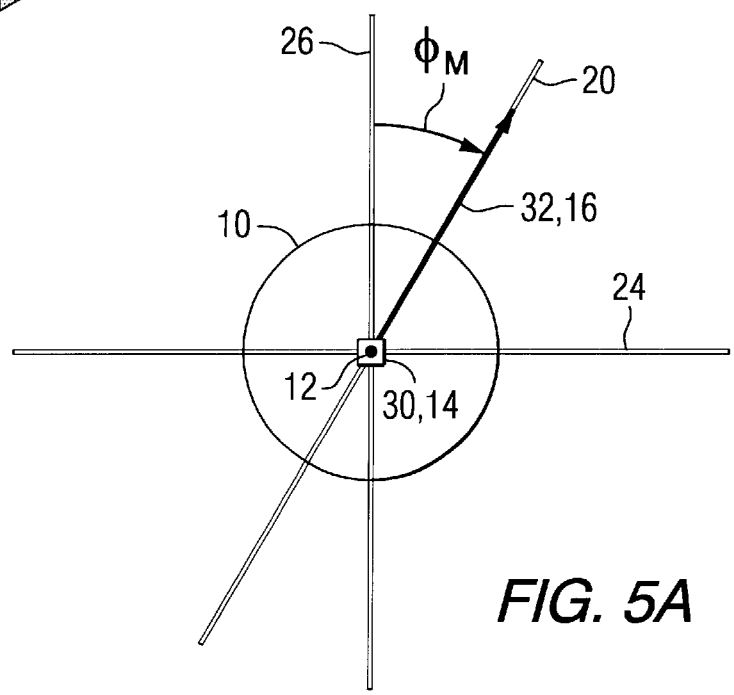
FIG. 5A is an end view of the body in FIG. 5.

FIG. 5 is a view, as in FIG. 2, however, with the magnetic field vectors, represented by arrows 36, oriented at an angle $\sigma_M$ of 45°, by way of example, and FIG. 5A is an end view representation. The magnetic plane and roll angle are defined as before so that equations (1), (2) and (3) apply to the individual magnetometers 14 and 30 with the substitution of the appropriate value of $\lambda_1$ or $\lambda_2$.

Figure 6:
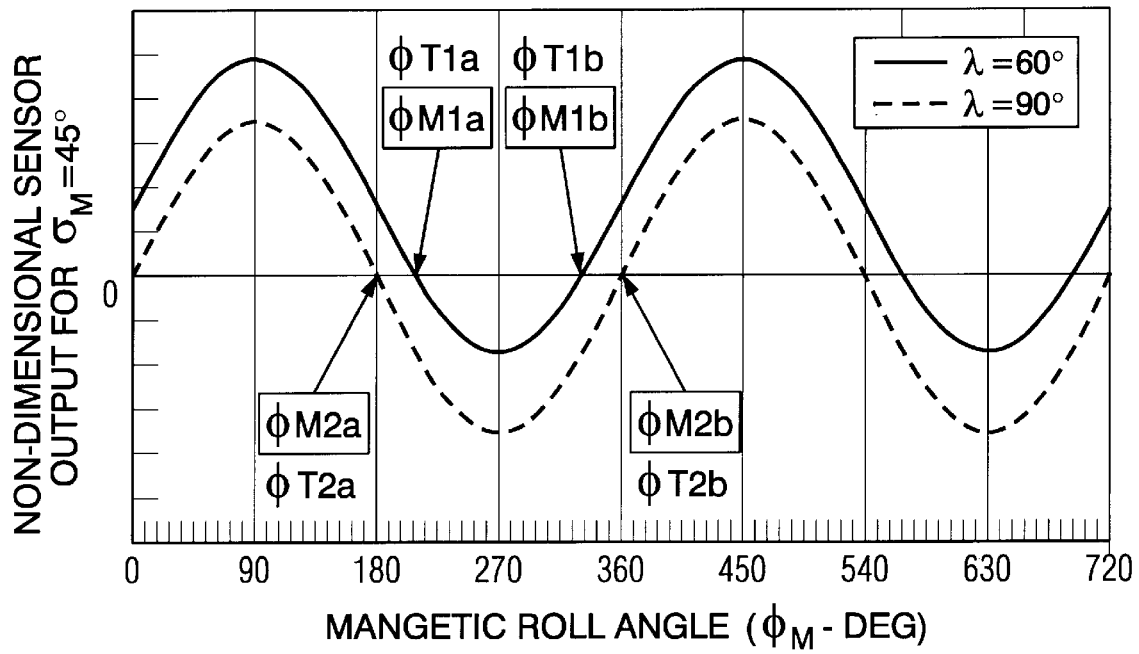
FIG. 6 are waveforms illustrating magnetometer amplitude versus magnetic roll angle for the embodiment of FIG. 4.

FIG. 6 shows the non-dimensionalized magnetometer outputs during two successive roll cycles for $\sigma_M=45°$, when $\lambda_1=60°$ and $\lambda_2=90°$. The output of the first magnetometer 14, whose axis is at an angle of 60° to the axis of rotation 12 is indicated by the solid curve, and the output of the second magnetometer 30, at 90°, is indicated by the dashed curve. The zero crossings on the two curves within a complete rotation beginning at $\phi_M=90°$ are indicated. The magnetic roll angles at which the first magnetometer's crossings occur on the solid curve, are designated ($\phi_{M1a}$ and $\phi_{M1b}$ respectively. The magnetic roll angles at which the second magnetometer's crossings occur on the dashed curve, are designated $\phi_{M2a}$ and $\phi_{M2b}$ respectively.

Similar to the single-sensor case, a ratio formed using the values of the roll angles at the zero crossings provides a unique discriminant of the value of $\sigma_M$. However the ratio for a dual-sensor system is formed using the magnetic roll angles for a set of four sequential zero crossings, two for each sensor. Viz:

$$\Phi = \left|\frac{\phi_{M1b} - \phi_{M1a}}{\phi_{M2b} - \phi_{M2a}}\right| \quad (5)$$

As was the case with a single-sensor implementation, a table of $\Phi$ versus $\sigma_M$ can be easily generated analytically for known values of $\lambda_1$ and $\lambda_2$, but unfortunately the manufacturing and installation tolerances are such that a laboratory calibration of the actual value of the $\lambda$'s will at times be required. Body roll positions at the orthogonality condition are measured for both magnetometers 14 and 30 and the table of $\Phi$, as defined by Equation 5, versus $\sigma_M$ is generated.

As before, the independent variable associated with the magnetometers' in-flight outputs will be time, and not magnetic roll angle. Denoting the times at which the four consecutive crossings indicated on FIG. 6 occur as $\phi_{T2a}$, $\phi_{T1a}$, $\phi_{T1b}$, and $\phi_{T2b}$ respectively, an estimate ($\overline{\Phi}$) of the ratio ($\Phi$) is obtained by $$\overline{\Phi} = \left|\frac{\phi_{T1b} - \phi_{T1a}}{\phi_{T2b} - \phi_{T2a}}\right|. \quad (6)$$

Again, if the roll rate is constant and $\sigma_M$ is invariant over the four zero-crossings, this estimated ratio is exactly the same as the calibration ratio. Further, the estimate of the dual-sensor ratio defined by Equation 6 results in accurate estimates of $\sigma_M$ even when the roll rate and orientation are changing. Simulation results for idealized sensors indicate that the dual-sensor system's accuracy is on the order of hundredths of degrees for a wide range of projectile kinematics representative of those seen in gun-launched and tube-launched ordnance projectiles.

The range of magnetic aspect angles, i.e., $\sigma_M$'s, defining the window for the dual-sensor embodiment is given by: $90 - \min(\lambda_1, \lambda_2) \leq \sigma_M \leq 90 + \min(\lambda_1, \lambda_2)$. Given the direction of the earth's magnetic field and an estimate of the range of $\sigma_M$ to be measured, configurations that result in sufficient measurement accuracy and resolution can be determined.

Figure 7:
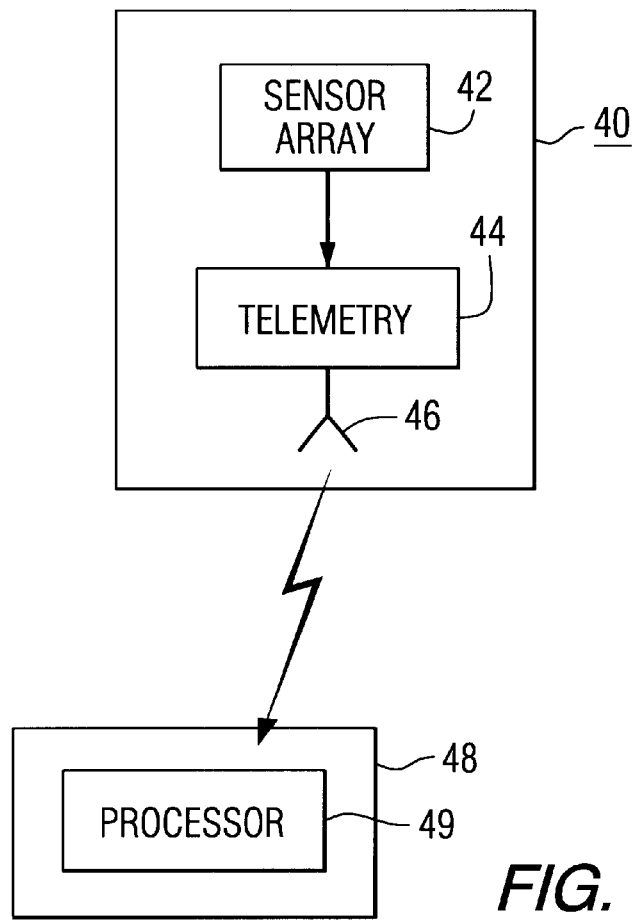
FIGS. 7 and 8 are block diagrams illustrating uses of the present invention.

For research and testing applications of the system, typical sensor data collection methods include telemetry transmission back to a ground station such as illustrated in FIG. 7. A body which rotates around an axis of rotation during flight is depicted by numeral 40. The body 40 carries a sensor array 42, comprised of one or more magnetometers, as previously described. The output signals from the sensor array 42 are provided to a telemetry unit 44, having an antenna 46, for transmission of the data to a ground station 48 having means, such as processor 49, operable to process the transmitted data for obtaining the time discriminant and comparing it with a roll angle discriminant in a previously generated look-up table. The comparison then gives an indication of the magnetic attitude during the flight.

Various methods of data collection can be used for telemetry applications such as analog data via FM/FM or digital data via pulse code modulation (PCM). Analog applications include FM/FM telemetry using high frequency voltage-controlled oscillators. Analog reduction techniques employing ground-based analog-to-digital conversion and curve fitting would be used to determine the instants of orthogonality (i.e., zero crossings of the signal). Digital applications would primarily use on board PCM systems to digitize the entire raw data traces for telemetry. The ultimate objective is to acquire a temporal history of the zero crossings of the on-board magnetic sensor(s). This history would then be used to generate $\sigma_M$, and, if desired, magnetic roll rate, and magnetic roll acceleration as required, using the times of zero crossings and ratio discriminant appropriate to the particular system configuration.

Figure 8:
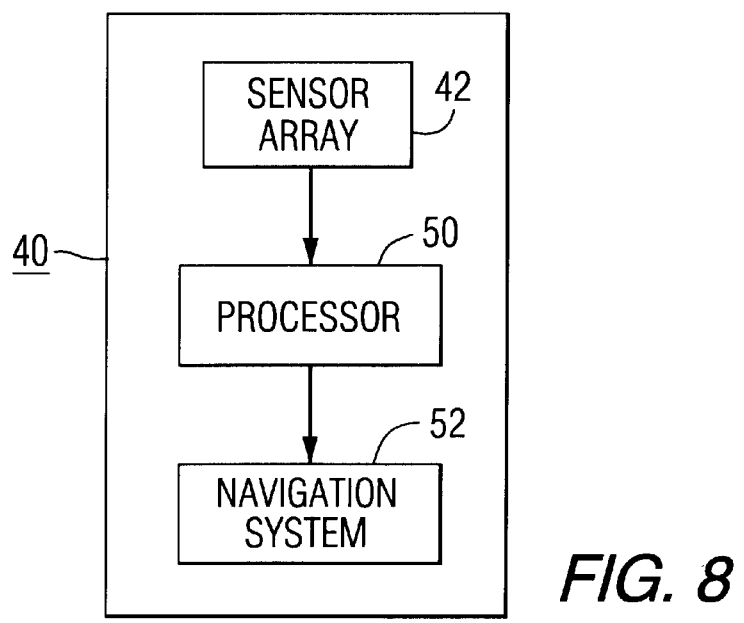

The simplicity of the system also lends itself to real-time, on-board determination of $\sigma_M$ and the roll rates. As illustrated in FIG. 8, this application requires the addition of an on-board processor 50 capable of carrying the appropriate $\Phi$ versus $\sigma_M$ table and computing $\overline{\Phi}$, as previously described. With this embodiment the system can be used in inertial measurement and navigation systems. For example, the processor 50 can be used to provide the computed data to an on-board navigation system 52 for directional control of the body 40.

Figure 9:
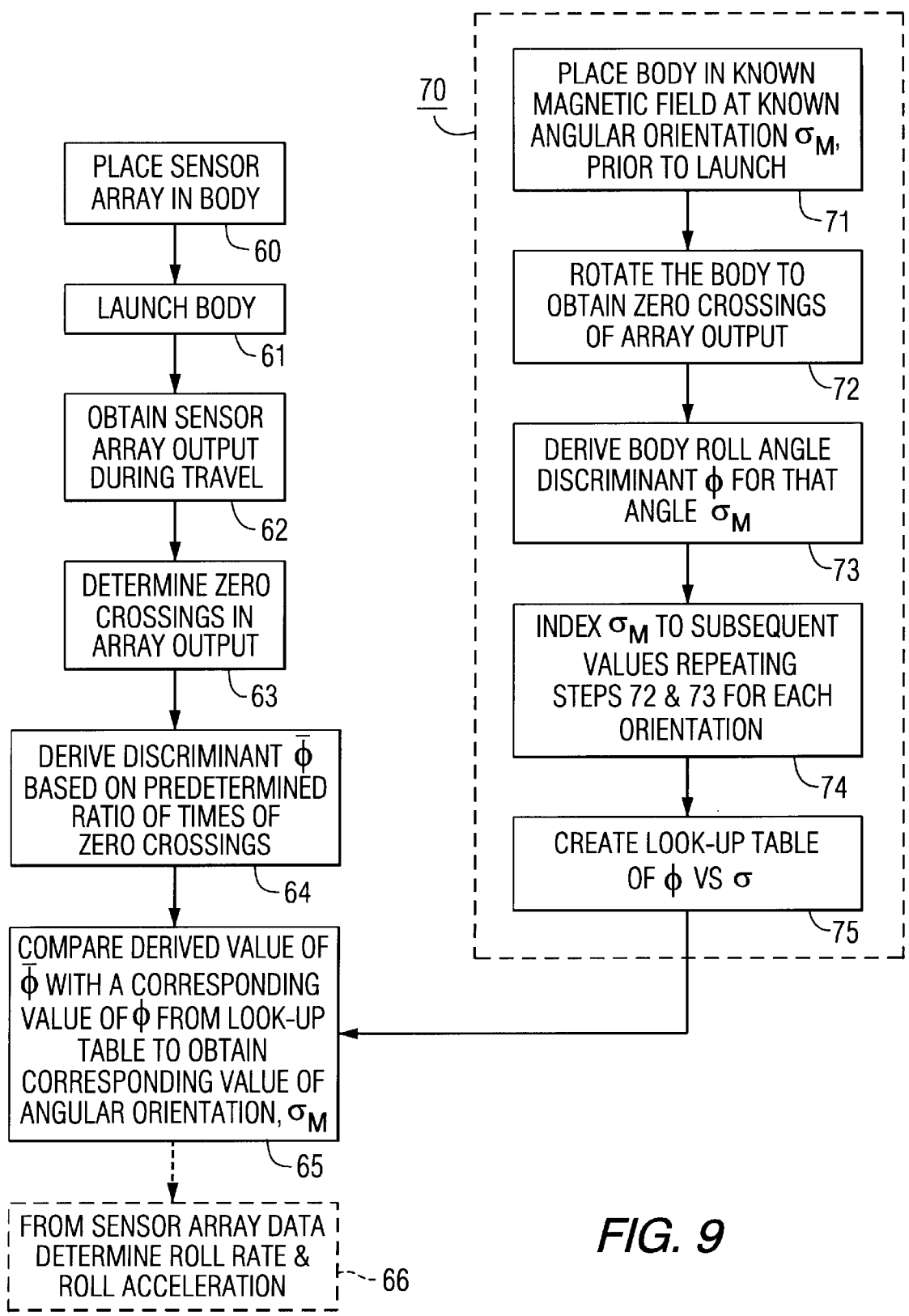
FIG. 9 illustrates the steps involved for obtaining magnetic aspect angle.

FIG. 9 illustrates the steps in practicing the present invention. The steps are self-explanatory and steps 60 to 65 illustrate the obtaining of the desired angular orientations experienced during travel of the body 10. Step 66 represents the obtaining of additional information, if desired, relative to body roll rate and roll acceleration. The look-up table generation is represented by numeral 70. The preferred generation of the look-up table is with the actual body to be flown, and is described in steps 71 to 75.

Though the system is illustrated herein by application to simple monolithic spinning bodies in free flight, application of the system to complex bodies in which substructures can be made to spin is accomplished by installation of magnetometers on the spinning portion(s) of the body. The present system includes any embodiment that derives magnetic orientation using magnetometers on a spinning structure to obtain a sequential identification of instances when there is no component of the ambient field along those sensor axes.

It will be readily seen by one of ordinary skill in the art that the present invention fulfills all of the objects set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A method of obtaining a continuous indication of the angular orientation $\sigma_M$ of a rotating body relative to, and traveling through, a magnetic field, comprising the steps of:

placing a sensor array having at least one magnetometer within said body prior to said travel, in a manner that said magnetometer will provide an output signal which varies between positive and negative values, said output signal having periodic zero crossings, during said travel as said body rotates;

separately generating a look-up table of i) angular orientations $\sigma_M$ vs. ii) body roll angle discriminants $\Phi$, based upon said zero crossings;

obtaining sequential time discriminants $\overline{\Phi}$ based upon said zero crossings, during said travel;

accessing said look-up table to compare said time discriminants with said body roll angle discriminants to obtain values for said angular orientation, experienced during said travel.

2. A method according to claim 1 which includes the steps of:

placing only a single magnetometer within said body;

generating a said body roll angle discriminant based upon three of said zero crossings.

3. A method according to claim 2 wherein:

the roll angles at successive ones of said zero crossings are $\Phi_1, \Phi_2, \Phi_3$ and said body roll angle discriminant $$\Phi = \left|\frac{\Phi_2 - \Phi_1}{\Phi_3 - \Phi_1}\right|;$$

the times at successive ones of said zero crossings during travel are $\phi_{Ta}, \phi_{Tb},$ and $\phi_{Tc}$;

said time discriminant $$\Phi = \left| \frac{\phi_{Tb} - \phi_{Ta}}{\phi_{Tc} - \phi_{Ta}} \right|.$$

4. A method according to claim 1 which includes the steps of:
placing first and second magnetometers within said body;
generating a said body roll angle discriminant based upon two of said zero crossings for each said magnetometer.

5. A method according to claim 4 wherein:
the two roll angles at which a first magnetometer's zero crossings occur are $\phi_{M1a}$ and $\phi_{M1b}$ respectively and the roll angles at which the second magnetometer's zero crossings occur are $\phi_{M2a}$ and $\phi_{M2b}$ respectively, and said body roll angle discriminant $$\Phi = \left| \frac{\phi_{M1b} - \phi_{M1a}}{\phi_{M2b} - \phi_{M2a}} \right|;$$

the times at consecutive ones of said zero crossings of both said magnetometers during travel are $\phi_{T2a}$, $\phi_{T1a}$, $\phi_{T1b}$, and $\phi_{T2b}$;
said time discriminant $$\Phi = \left| \frac{\phi_{T1b} - \phi_{T1a}}{\phi_{T2b} - \phi_{T2a}} \right|.$$

6. A method according to claim 1 which includes the steps of:
generating said look-up table utilizing the actual body, prior to said travel.

7. A method according to claim 6 which includes the steps of:
placing said body in a known magnet field at a known angular orientation $\sigma_M$;
rotating said body to obtain said zero crossings;
deriving said body roll angle discriminant for that $\sigma_M$;
indexing said angular orientation $\sigma_M$ to new values and repeating the above steps for each said orientation until a desired said look-up table is completed.

8. A system for obtaining a continuous indication of the angular orientation $\sigma_M$ of a rotating body relative to, and traveling through, a magnetic field, comprising:
a sensor array positioned within said body and including at least one magnetometer operable to provide an output signal which varies between positive and negative values, said output signal having periodic zero crossings, during said travel as said body rotates;
means for determining the relative time occurrence of said zero crossings;
means for generating time discriminants based upon said time occurrences;
means for comparing said time discriminants with a precalculated body roll angle discriminants, each a function of the roll angle of said body at zero crossings at a particular angle of $\sigma_M$; and
means for obtaining an indication of said angular orientation value as a result of said comparison.

9. A system according to claim 8 wherein:
said body has an axis of rotation;
said sensor array is comprised of a single magnetometer;
said magnetometer has a sensitive axis at an angle $\lambda$ with respect to said axis of rotation, where $0° < \lambda < 90°$.

10. A system according to claim 8 wherein:
said body has an axis of rotation;
said sensor array is comprised of first and second magnetometers;
said first magnetometer has a sensitive axis at an angle $\lambda_1$ with respect to said axis of rotation;
said second magnetometer has a sensitive axis at an angle $\lambda_2$ with respect to said axis of rotation;
said sensitive axis of said first magnetometer and said sensitive axis of said second magnetometer are coplanar.

11. A system according to claim 10 wherein:
said angles $\lambda_1$ and $\lambda_2$ are non-supplementary.

12. A system according to claim 8 wherein:
said body is an artillery fuze.

* * * * *